United States Patent
Clay, IV

(10) Patent No.: US 9,116,730 B1
(45) Date of Patent: *Aug. 25, 2015

(54) GADGET CONTAINER VERIFICATION

(75) Inventor: Buckner W. Clay, IV, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 13/551,426

(22) Filed: Jul. 17, 2012

Related U.S. Application Data

(63) Continuation of application No. 12/577,636, filed on Oct. 12, 2009, now Pat. No. 8,266,695.

(51) Int. Cl.
*G06F 17/00* (2006.01)
*G06F 9/455* (2006.01)

(52) U.S. Cl.
CPC .................................. *G06F 9/45529* (2013.01)

(58) Field of Classification Search
CPC ...... G06F 21/51; G06F 11/00; G06F 9/45529
USPC ........................................................ 715/234
See application file for complete search history.

(56) References Cited

U.S. PATENT DOCUMENTS 8,407,576 B1 * 3/2013 Yin et al. ....................... 715/206
2008/0222658 A1 * 9/2008 Allen et al. .................... 719/320

* cited by examiner

*Primary Examiner* — Scott Baderman
*Assistant Examiner* — Mustafa Amin
(74) *Attorney, Agent, or Firm* — Johnson, Marcou & Isaacs, LLC

(57) ABSTRACT

A system, method, and computer program product verifies web page containers of software gadgets. A request for a software gadget is received by a gadget server from a web browser at a client. The request includes a container web page parameter that identifies a web page. The gadget server determines whether the identified web page is an acceptable web page for containing the requested software gadget. If it is determined to be acceptable, the requested software gadget is prepared by inserting container verification code into the gadget. When the prepared software gadget is provided to the client, the container verification code executes and ensures that the requested software gadget is contained within the identified web page. The container verification code may include code for setting a container web page of the prepared software gadget to be the identified web page and for preventing unnecessary page reloads.

20 Claims, 5 Drawing Sheets

GADGET CONTAINER VERIFICATION

CROSS REFERENCE TO RELATED APPLICATIONS

This application is a continuation of prior application Ser. No. 12/577,636, filed Oct. 12, 2009, which is incorporated by reference in its entirety.

BACKGROUND

1. Field of the Invention

This invention pertains in general to software downloaded via networks such as the Internet, and in particular to software for executing in a web browser.

2. Description of the Related Art

Gadgets are types of modular applications that can be included in containers. A gadget may provide a real-time weather report or a live news feed, for example. A gadget may allow a user to submit payment information for a product or service. Such a gadget may be used in online payment processing services such as Google Checkout. For example, a user may enter a credit card number and payment amount in input fields within the gadget and press a button within the gadget to submit the information for processing.

Gadgets can be included in various types of containers, such as web pages. A container web page may include a gadget by having a frame that refers to the location, such as a Uniform Resource Locator (URL), of the gadget. When the container web page is displayed to a user through the user's web browser, the contents of the gadget (e.g., code and user interface elements) are retrieved and the gadget is run within the frame on the displayed web page.

Generally, a container web page can include a frame referencing the URL of any publicly available gadget. However, it may be desirable for a gadget's use to be restricted to certain approved containers for various reasons. The individual, organization, or company providing the gadget, referred to here as the "gadget provider," may want to prevent unknown entities from including the gadget on their web pages. Such unknown entities may place the gadget on web pages containing objectionable content, for example. Also, a web page of an unknown entity may perform malicious actions that compromise the security of the gadget.

Most web browsers prevent a gadget contained in a frame from directly determining the identity of the container web page (e.g., by executing a command requesting this information from the web browser). This is done for various security reasons, such as protecting the privacy of a user viewing the container web page. Therefore, there is a need in the art for a way for a gadget to verify that it is running in an approved or non-malicious container.

BRIEF SUMMARY OF THE INVENTION

The above need is met by a system, method, and computer program product for verifying web page containers of software gadgets. In one embodiment, a request for a software gadget is received by a gadget server from a web browser at a client. The request includes a container web page parameter that identifies a web page. The gadget server determines whether the identified web page is an acceptable web page for containing the requested software gadget. If it is determined to be acceptable, the requested software gadget is prepared by inserting container verification code into the gadget. When the prepared software gadget is provided to the client, the container verification code executes and ensures that the requested software gadget is contained within the identified web page. The container verification code may include code for setting a container web page of the prepared software gadget to be the identified web page, and this code may be configured to prevent a page reload if the container web page is the identified web page.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
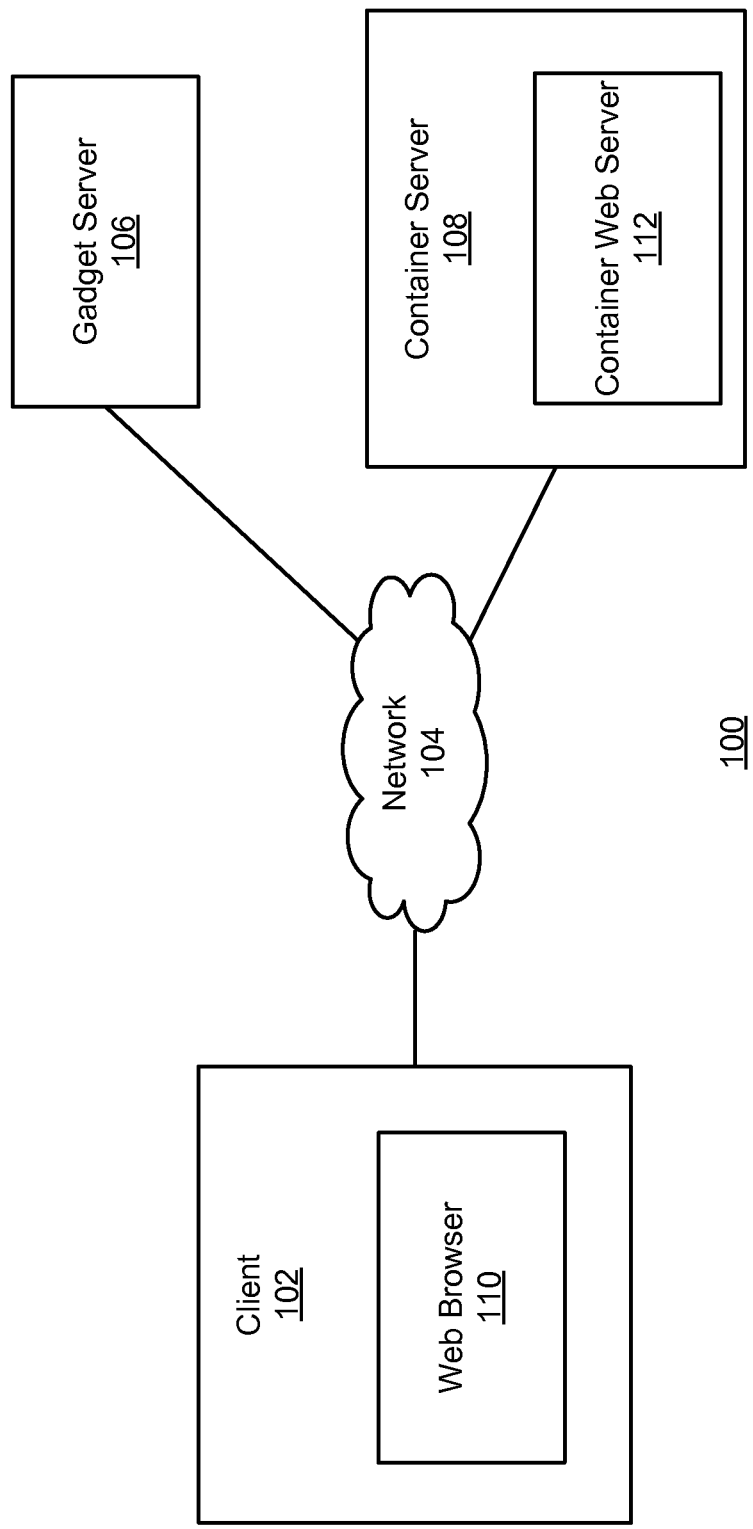
FIG. 1 is a high-level diagram illustrating a networked environment that includes a gadget server, container server, and client for verifying gadget containers, in one embodiment.

FIG. 1 is a high-level diagram illustrating a networked environment 100 that includes a gadget server 106, container server 108, and client 102 for verifying gadget containers, in one embodiment. The client 102, gadget server 106, and container server 108 are connected by network 104. In one embodiment, network 104 is the Internet. The gadget server 106 and the container server 112 may be operated by different entities (e.g., different companies or organizations). The entity operating the gadget server 106 is referred to here as the "gadget provider". The entity operating the container server 112 is referred to here as the "container provider".

In one embodiment the client 102 runs a web browser 110, and the browser displays a container web page provided by the container server 108. This container web page requests a gadget from the gadget server 106 for inclusion in a frame of the web page. The container web page also passes a parameter to the gadget server 106 for identifying the container web page (e.g., by its URL) to the gadget server. The gadget server 106 determines whether the web page identified by the parameter is an acceptable container for the requested gadget. If the web page identified by the parameter is not acceptable, the gadget is not provided (or is provided in a disabled form). If the web page identified by the parameter is acceptable, the gadget is provided for display within the container web page on the web browser 110. Since it is possible that the container web page is maliciously spoofing (pretending to be) an acceptable web page by providing a container web page parameter that does not accurately identify itself, the gadget includes code to set the container web page to be the web page identified by the parameter, rendering the spoofing ineffective. If the parameter was accurate, the container web page remains the same. Otherwise, the container web page is redirected to a web page identified by the acceptable parameter.

The client 102 is a workstation or personal computer operated by a user. The user may be unrelated to the gadget provider and the container provider. The client 102 runs a web browser 110 such as Google Chrome. The web browser 110 is able to retrieve web pages provided by the container server 108 and gadgets provided by the gadget server 106 and display them to the user. The web browser 110 retrieves web pages and gadgets by sending a Hypertext Transfer Protocol (HTTP) request to an appropriate server, where the HTTP request contains the Uniform Resource Locator (URL) of the desired web page or gadget.

The container server 108 includes a container web server 112 that provides a web page to the web browser 110 of the client 102 in response to an HTTP request from the web browser. This web page, referred to here as the container web page, may be a page of interest to the user, such as a page showing items available for purchase from the container provider. The web browser 110 requests the container web page from the container server 108 as a result of the user selecting the container web page URL in the browser (e.g., by clicking a link).

The container web page includes a reference to a gadget within a frame of the web page. In one embodiment, this is done using a Hyper Text Markup Language (HTML) inline frame which is specified by an <iframe> tag. An inline frame can hold a gadget (e.g., HTML and/or JavaScript), within the boundaries of the frame. The reference to the gadget is included in the <iframe> tag. For example, the tag: <iframe src="https://checkout.gadget.com/gadget6/"> may be included at some position in the container web page HTML code. In this example, the URL of the gadget is "https://checkout.gadget.com/gadget6", where checkout.gadget.com is a domain name of the gadget server 106. As part of the process of rendering the container web page, the web browser retrieves the gadget from the gadget server 106 by sending a HTTP request containing the URL of the gadget. This request is referred to below as the gadget request.

A parameter can also be provided from the container web page to the gadget server 106 in the gadget request for identifying the container web page to the gadget server. This parameter is referred to below as the container web page parameter. The container web page parameter can be embedded in the gadget URL that is included in the container web page HTML. The container web page parameter may be a part of a query string of the URL, where a query string comprises the characters following a "?" character in the URL. For example, the container web page HTML may include the tag <iframe src="https://checkout.gadget.com/gadget6?container=http%3a%2f%2fwww.container.com%2findex.html"> where "http%3a%2f%2fwww.container.com%2findex.html" is a percent-encoded (also known as URL encoded) version of "http://www.container.com/index.html", which is the container web page parameter provided to the gadget server 106.

Figure 2:
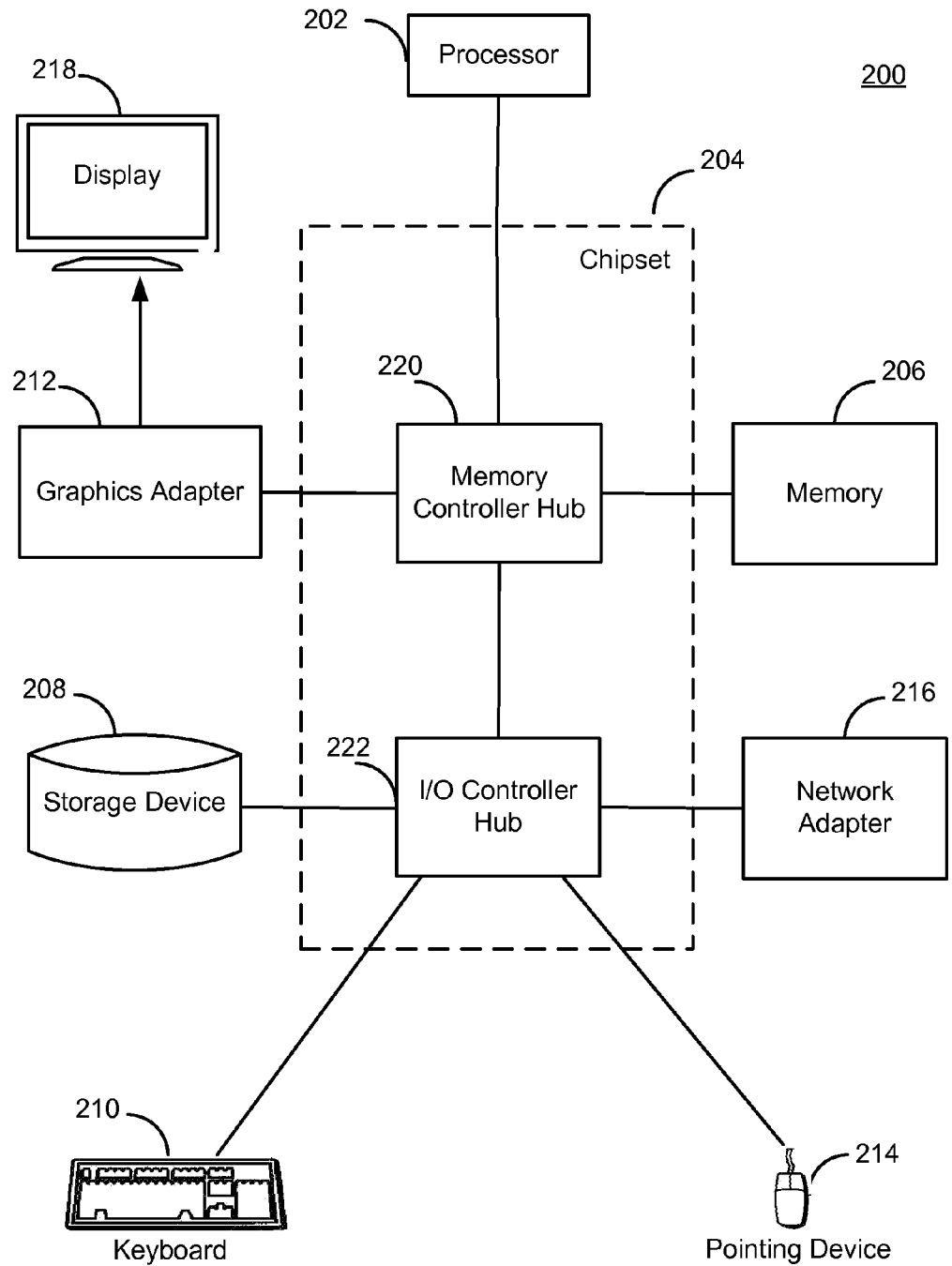
FIG. 2 is a high-level block diagram of a computer for acting as a client, a gadget server, and/or a container server according to one embodiment.

FIG. 2 is a high-level block diagram of a computer 200 for acting as a client 102, a gadget server 106, and/or a container server 108 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a gadget server 106 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
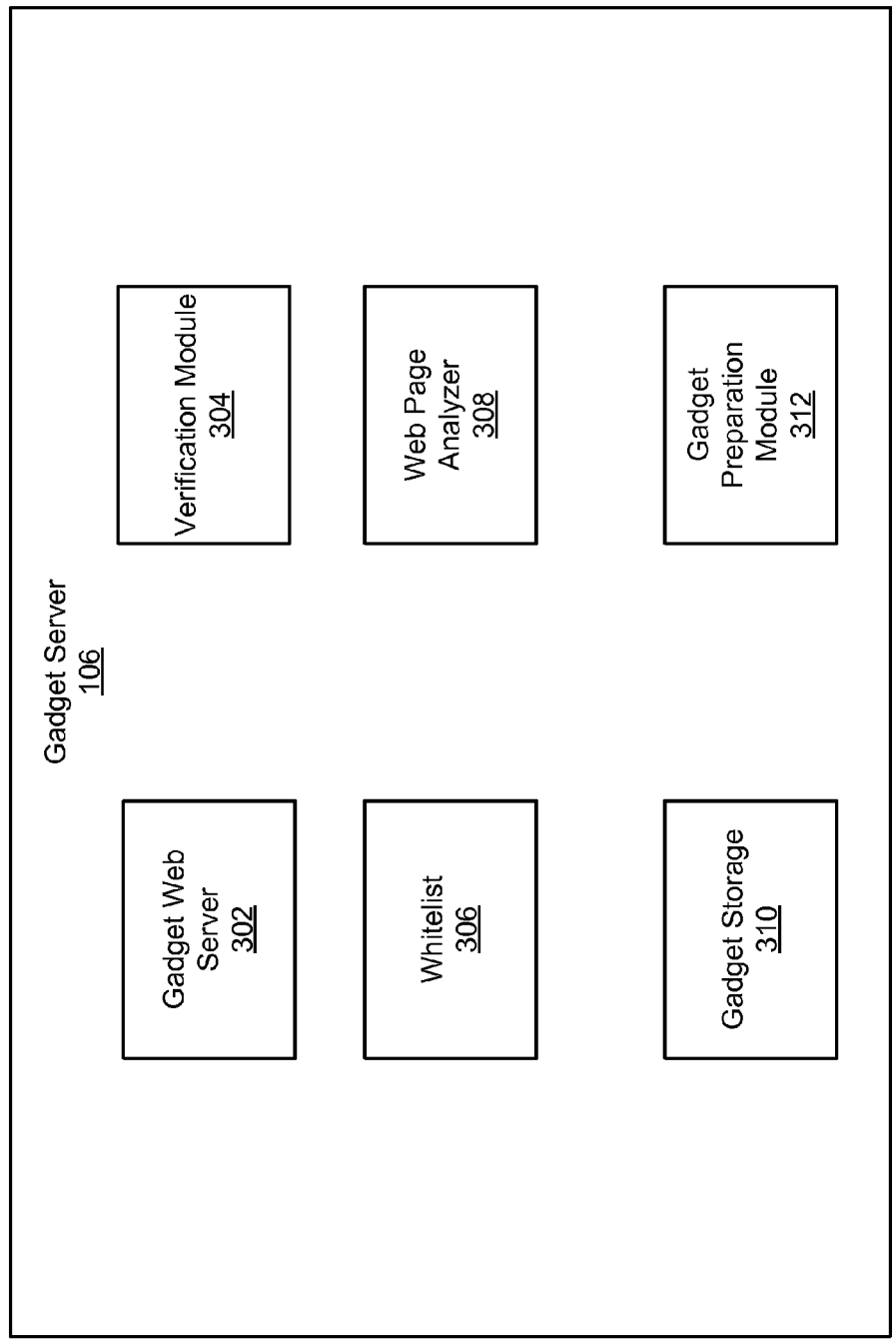
FIG. 3 illustrates a logical view of the gadget server for providing gadgets for inclusion in container web pages.

FIG. 3 illustrates a logical view of the gadget server 106 for providing gadgets for inclusion in container web pages. As mentioned above, the web browser 110 sends a gadget request to the gadget server, the gadget request including a container web page parameter which may be part of the gadget URL. In one embodiment, the gadget provider publishes an interface (e.g., to the public or to container providers who may be interested in using gadgets) specifying how the container web page parameter should be included in the gadget URL. For example, the gadget provider may specify that any requests for gadgets must include the query string "container=XXX" where XXX is the container web page parameter.

The gadget web server 302 receives the gadget request from the web browser 110. The gadget web server 302 parses the URL within the gadget request to determine the requested gadget and the container web page parameter. For example, if the gadget URL is "https://checkout.gadget.com/gadget6?container=http://www.container.com/index.html" (percent-encoding not shown), the gadget web server 302 can parse the URL to determine that the name of the requested gadget is "gadget6" and the container web page parameter is "http://www.container.com/index.html". The gadget web server 302 can pass the container web page parameter and identity of the requested gadget to the verification module 304 for determining whether the container web page parameter identifies an acceptable container for the gadget.

If the container web page parameter is found to be acceptable, the gadget web server 302 requests the gadget from the gadget preparation module 312 and sends it to the web browser 110. If it is not found to be acceptable, the gadget web server 302 returns an error (e.g., HTTP 403) to the web browser 110 or sends a disabled gadget to the web browser. The disabled gadget can be a gadget that does not include the functionality of the requested gadget but rather includes limited or no functionality. For example, a disabled gadget may cause the message "This Gadget is not permitted to run from this web page" to be displayed within the inline frame in the container web page.

The verification module 304 determines whether the container web page parameter identifies an acceptable container for the requested gadget (i.e., whether the container web page parameter is the location of an acceptable container web page). The verification module 304 sends the result of the determination to the gadget web server 302. In one embodiment, the verification module 304 consults a whitelist 306 to make the determination. If the container web page parameter is included in the whitelist 306, then the verification module 304 determines that the container web page parameter is acceptable. In one embodiment, there may be separate whitelists 306 associated with different gadgets, and the appropriate whitelist is checked based on the specific gadget requested. The verification module 304 may also use other methods for determining the acceptability of a container web page parameter. In one embodiment, a blacklist may be used. In this case, a container web page parameter is considered to be allowable unless it appears on the blacklist. In one embodiment, the container web page parameter can be sent to the web page analyzer 308, further described below, which determines whether it is acceptable.

The whitelist 306 contains a list (or table, database, etc.) of acceptable web pages and/or web sites. An entry in the whitelist 306 such as "http://www.container.com/index.html" may indicate the acceptability of a particular web page, while an entry such as "container.com" may indicate that any web pages from the particular domain are acceptable. The whitelist 306 may be constructed by the gadget provider and may include web sites that have been authorized by the gadget provider or that have paid a subscription fee to the gadget provider, for example. It may include web sites and pages that have been manually inspected and approved by the gadget provider. It may include web sites that are generally known to be reputable and that are unlikely to perform malicious actions relating to the gadget. As mentioned above, there may be different whitelists 306 corresponding to different gadgets (or a single whitelist where each entry is associated with specified gadgets).

The web page analyzer 308 can dynamically determine whether the container web page parameter is acceptable. In one embodiment, the web page analyzer 308 retrieves the web page indicated by the container web page parameter from the container server 108 (e.g., by sending a HTTP request to the container server). The web page analyzer 308 then analyzes the retrieved web page to determine whether the container web page parameter is acceptable. The web page analyzer 308 can look for HTML elements or code (e.g., JavaScript code) that are likely to be malicious or to otherwise interfere with the proper operation of the gadget. The web page analyzer 308 can also look for objectionable material (e.g., words, pictures) that the gadget provider does not want to have associated with the gadget. Based on the analysis, the web page analyzer 308 returns a determination of acceptability to the verification module 304.

The gadget storage 310 stores gadgets to be sent to the web browser 110 in response to requests received by the gadget web server 302 as described above. A gadget may comprise a HTML document that can be displayed within an inline frame. The gadget may contain HTML elements such as text, buttons, and input fields. The gadget may also contain code (e.g., JavaScript) for providing active content or providing various other functionality such as processing credit card information. Gadgets may be created by software developers associated with the gadget provider. The gadget store 310 can store multiple gadgets, where a gadget can be retrieved by name or other identifier.

The gadget preparation module 312 prepares a gadget to be sent to the web browser 110 by the gadget web server 302. The gadget preparation module 312 receives a request for a particular gadget from the gadget web server 302. It also receives the container web page parameter from the gadget web server 302. The gadget preparation module retrieves the requested gadget from the gadget storage 310. Before sending the retrieved gadget to the gadget web server 302, the gadget preparation module 312 inserts code into the gadget that, when executed from within the gadget in the web browser 110 on the client, causes the gadget to set its containing web page to be the web page identified by the container web page parameter. This code is referred to below as container verification code.

In one embodiment, the inserted code is JavaScript code. For example, if the container web page parameter is "http://www.container.com/index.html", the gadget preparation module 312 inserts the following container verification code in the retrieved gadget:

```
<script>
    window.top.location="http://www.container.com/in-
        dex.html#"
</script>
```

This code, when executed from within an inline frame, sets the location of the containing web page to be the container web page parameter. Since the gadget may be located in a frame within a frame, the location of the outermost frame (e.g., "window.top") is set to be the container web page parameter. window.parent.location can also be used instead of window.top.location.

By inserting this container verification code in the gadget, the gadget preparation module 312 prevents the gadget from being included in a container that is not determined to be acceptable. As described above, the verification module 304 performs verification based on the container web page parameter. Though the container web page is supposed to provide the address of itself as the parameter, the container web page may provide a different, incorrect address as the parameter in an attempt to trick the gadget server 106 into allowing the gadget to be included in the web page. This is also referred to as a spoofing attempt by the container web page (or container provider). The container verification code defeats the spoofing attempt by setting the container web page to be the acceptable container web page parameter, regardless of whether the parameter accurately identifies the container web page before execution of the container verification code.

If the container web page parameter accurately identifies the container web page, then setting the container web page to be the container web page parameter does not change the container web page. In one embodiment, the container verification code is designed to prevent the container web page from reloading in this case. In one embodiment, this is accomplished by including a hash character, '#', at the end of the web address specified by the container web page parameter. The hash character is a type of fragment identifier for identifying an HTML anchor. One effect of using the fragment identifier in the container verification code is that no reload occurs when setting the container web page location to the same location (with the hash character added). As a result, if the location of the container web page was already the container web page parameter, then the container verification code that sets the location of the container web page doesn't cause any action to occur (i.e., it is a no-operation).

If the fragment identifier were not used, then the code to set the container web page may cause the page to be reloaded. Such a reload is undesirable because it is distracting and confusing to the user and it slows down the user's interaction with the web browser 110. Also, the reload may cause another gadget request to be sent to the gadget server 106, which may cause another gadget to be sent to the web browser 110 which causes another reload, possibly resulting in an infinite loop where the container web page is continuously reloaded.

In one embodiment, if the container web page parameter already includes a fragment identifier (e.g., the '#' character), an additional fragment identifier is not added to the end of the container web page parameter. For example, if the web page parameter is "http://www.container.com/index.html#foo", then additional '#' character is not added to the end by the gadget preparation module 312. A container web page parameter that already includes a fragment identifier does not cause a page reload when the container web page is set to the container web page parameter.

Through the use of the verification module 304 and the gadget preparation module 312, the gadget is included only in an acceptable container web page, regardless of whether the container web page parameter accurately identifies the original container web page requesting the gadget. If the container web page parameter is not accepted by the verification module 304, then the requested gadget is not provided. If the container web page parameter is accepted by the verification module 304 and if it accurately identifies the original container web page, then the container verification code will result in a no-operation. If the container web page parameter is accepted by the verification module 304 and if it inaccurately identifies the original container web page (i.e., attempts to spoof), then the container web page will be redirected to the location indicated by the container web page parameter. The gadget may then be included in this acceptable web page.

Figure 4:
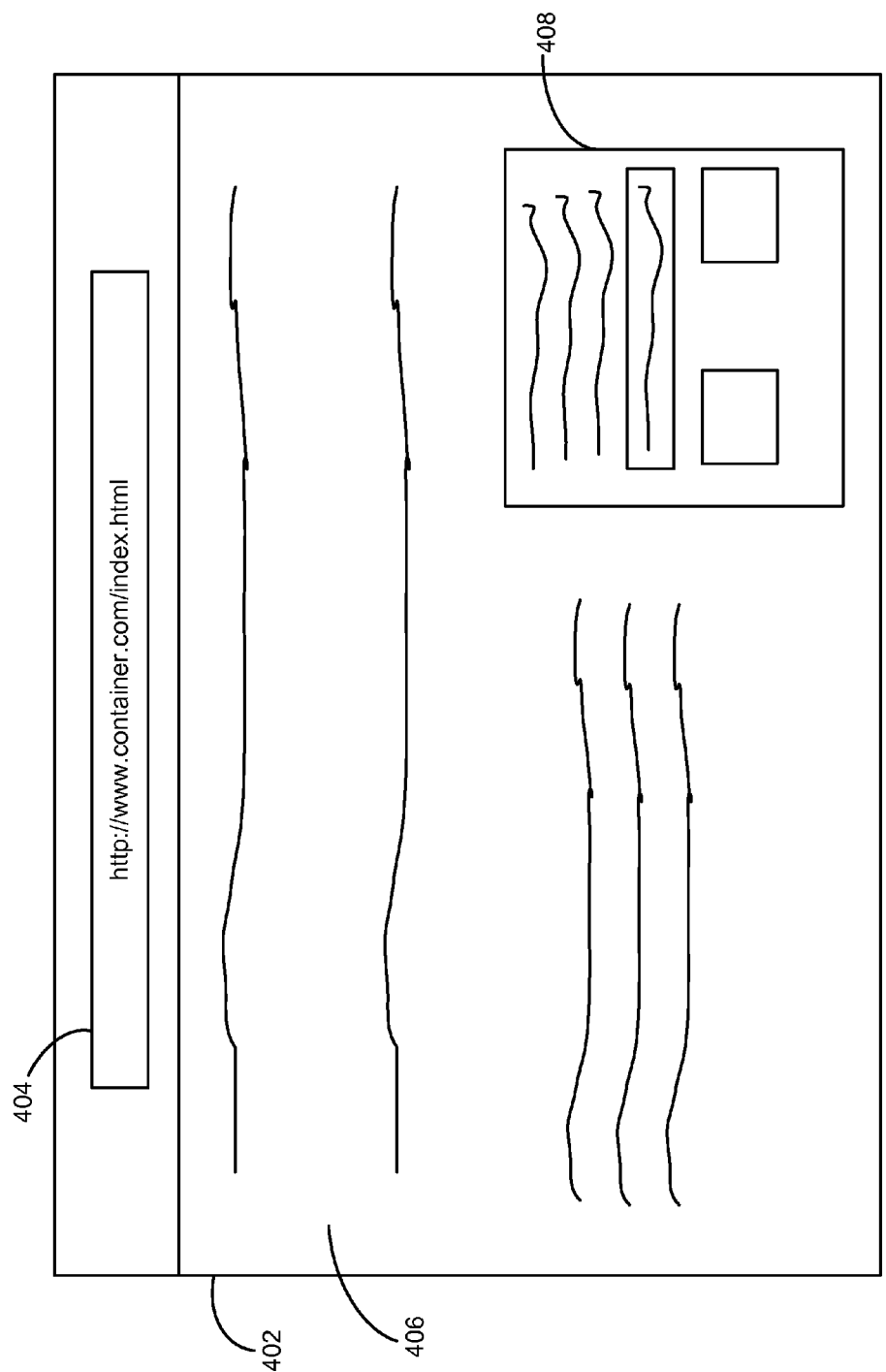
FIG. 4 illustrates a sample container web page including a gadget, in one embodiment.

FIG. 4 illustrates a sample container web page 406 including a gadget 408, in one embodiment. The container web page 406 is displayed in a web browser window 402 of the web browser 110. The web browser window 402 includes an address bar 404 indicating the URL of the displayed container web page 406. The container web page 406 includes a gadget 408 displayed in a frame. The gadget 408 may provide various functionality such as checkout functionality and may include various user interface elements and code. The gadget 408 includes container verification code to ensure that the location of the container web page 406 is the container web page parameter that was verified by the gadget server 106.

Figure 5:
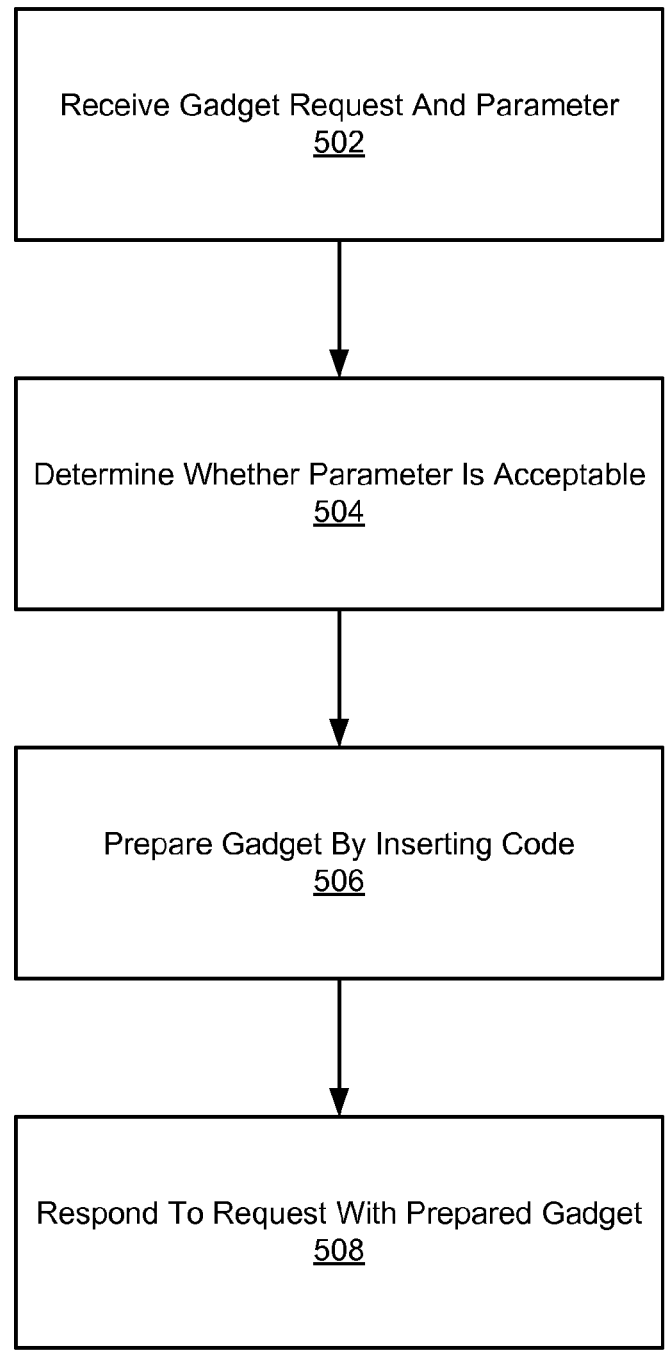
FIG. 5 is a flowchart illustrating a method for verifying gadget containers, in one embodiment.

FIG. 5 is a flowchart illustrating a method for verifying gadget containers, in one embodiment. The gadget web server 302 receives 502 a gadget request from the web browser 110 of the client 102 when the web browser attempts to display a container web page. The request includes a container web page parameter. The verification module 304 determines 504 whether the container web page parameter identifies an acceptable container web page. The verification module 304 may use a whitelist 306, a web page analyzer 308, or various other techniques. If the container web page parameter is determined to not be acceptable, the requested gadget is not returned to the web browser 110. If the container web page parameter is determined to be acceptable, the requested gadget is retrieved from the gadget storage 310 and is prepared 506 by the gadget preparation module 312. The gadget preparation module 312 inserts container verification code into the gadget to cause the gadget to set its container web page to be the location identified by the container web page parameter. The gadget web server 302 responds 508 to the request from the web browser 110 with the prepared gadget. The code inserted by the gadget preparation module 312 then executes in the web browser 110 at the client.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for verifying a gadget container, the method comprising:

using a computer to perform steps comprising:
receiving a request from a client for a software gadget, the request comprising a container web page parameter identifying a web page that will contain the software gadget by loading the software gadget into an inline frame;
determining whether the identified web page is an acceptable web page for containing the requested software gadget; and
responsive to determining that the identified web page is an acceptable web page for containing the requested software gadget:
preparing the requested software gadget by inserting container verification code into the requested software gadget, the container verification code executable on the client to set a container web page of the prepared software gadget to be the identified web page; and
providing the prepared software gadget to the client.

2. The computer-implemented method of claim 1, wherein determining whether the identified web page is an acceptable web page for containing the requested software gadget further comprises:
determining whether the identified web page matches an entry in a whitelist.

3. The computer-implemented method of claim 1, wherein the container web page parameter comprises a uniform resource locator (URL) of the identified web page.

4. The computer-implemented method of claim 1, further comprising:
responsive to determining that the identified web page is not an acceptable web page for containing the requested software gadget:
providing a disabled software gadget to the client.

5. The computer-implemented method of claim 1, wherein the inline frame is a specified by an <iframe> tag.

6. The computer-implemented method of claim 1, wherein the container verification code executable on the client to set the container web page of the prepared software gadget to be the identified webpage comprises executable code to set the location of the outermost frame to be the web page identified by the container web page parameter.

7. The computer-implemented method of claim 1, wherein the prepared software gadget comprises an HTML document.

8. A computer system for verifying gadget containers, the system comprising:
a non-transitory computer-readable storage device storing executable computer program modules for:
receiving a request from a client for a software gadget, the request comprising a container web page parameter identifying a web page that will contain the software gadget by loading the software gadget into an inline frame;
determining whether the identified web page is an acceptable web page for containing the requested software gadget; and
responsive to determining that the identified web page is an acceptable web page for containing the requested software gadget:

preparing the requested software gadget by inserting container verification code into the requested software gadget, the container verification code executable on the client to set a container web page of the prepared software gadget to be the identified web page; and providing the prepared software gadget to the client; and a processor for executing the computer program modules.

9. The computer system of claim 8, wherein determining whether the identified web page is an acceptable web page for containing the requested software gadget further comprises:

determining whether the identified web page matches an entry in a whitelist.

10. The computer system of claim 8, wherein the container web page parameter comprises a uniform resource locator (URL) of the identified web page.

11. The computer system of claim 8, wherein the executable computer program modules are further configured for:

responsive to determining that the identified web page is not an acceptable web page for containing the requested software gadget:

providing a disabled software gadget to the client.

12. The computer system of claim 8, wherein the inline frame is a specified by an <iframe> tag.

13. The computer system of claim 8, wherein the container verification code executable on the client to set the container web page of the prepared software gadget to be the identified webpage comprises executable code to set the location of the outermost frame to be the web page identified by the container web page parameter.

14. The computer system of claim 8, wherein the prepared software gadget comprises an HTML document.

15. A computer program product having a non-transitory computer storage device storing executable computer program instructions for verifying gadget containers, the computer program instructions comprising instructions for:

receiving a request from a client for a software gadget, the request comprising a container web page parameter identifying a web page that will contain the software gadget by loading the software gadget into an inline frame; determining whether the identified web page is an acceptable web page for containing the requested software gadget; and responsive to determining that the identified web page is an acceptable web page for containing the requested software gadget:

preparing the requested software gadget by inserting container verification code into the requested software gadget, the container verification code executable on the client to set a container web page of the prepared software gadget to be the identified web page; and providing the prepared software gadget to the client.

16. The computer program product of claim 15, wherein determining whether the identified web page is an acceptable web page for containing the requested software gadget further comprises:

determining whether the identified web page matches an entry in a whitelist.

17. The computer program product of claim 15, wherein the container web page parameter comprises a uniform resource locator (URL) of the identified web page.

18. The computer program product of claim 15, wherein the computer program instructions further comprise instructions for:

responsive to determining that the identified web page is not an acceptable web page for containing the requested software gadget:

providing a disabled software gadget to the client.

19. The computer program product of claim 15, wherein the inline frame is a specified by an <iframe> tag.

20. The computer program product of claim 15, wherein the container verification code executable on the client to set the container web page of the prepared software gadget to be the identified webpage comprises executable code to set the location of the outermost frame to be the web page identified by the container web page parameter.

\* \* \* \* \*